３,577,384
STABILIZED MOULDING COMPOSITIONS FROM
POLYMERS OF α-OLEFINS
Otto Mauz, Niederhofheim, Taunus, and Eberhard Prinz,
Kelkheim, Taunus, Germany, assignors to Farbwerke
Hoechst Aktiengesellschaft vormals Meister Lucius &
Bruning, Frankfurt am Main, Germany
No Drawing. Filed July 7, 1969, Ser. No. 839,713
Claims priority, application Germany, July 10, 1968,
P 17 69 765.3
Int. Cl. C08f 45/58
U.S. Cl. 260—45.85          4 Claims

ABSTRACT OF THE DISCLOSURE

Moulding compositions from polyolefins and a stabilizer mixture which consists of a tetraphenol and a dialkyl disulfide which are especially suitable for the manufacture of shaped articles coming into contact with hot water.

---

The present invention relates to stabilized moulding compositions from polymers of α-olefins.

It has been proposed to use various compounds and classes of compounds to stabilize plastics against an accelerated aging by the action of oxygen, especially at elevated temperatures or in the presence of light. Thus, for improving the resistance to aging of polyolefins, phenol derivatives, aromatic amines, substituted amino phenols or organic sulfides, the organic radicals of which may be of aromatic and advantageously aliphatic nature, are for example used.

The efficiency of some stabilizers can be considerably improved by simultaneously adding compounds of stabilizer classes of different nature.

Such synergistic systems have the advantage that in general their efficiency is much higher than the sum of the efficiencies of the individual stabilizer components. Although a large number of synergistic mixtures have been proposed in the course of time, it cannot be predicted whether determined stabilizer mixtures have a synergistic effect.

It is known from German Pat. 1,235,582 that tetraphenolic compounds in combination with determined sulfur compounds can be used as stabilizers for polyolefins. Those stabilizers have, however, the disadvantage, that they are extracted by boiling water when exposed to it for a prolonged time and that the polymer consequently becomes brittle. It is therefore desirable to find stabilizers which resist to extraction by boiling water.

Now, we have found, that moulding compositions of polyolefins and a stabilizer mixture consisting of components (a) and (b), which have excellent properties, can be obtained by using, as component (a), a tetraphenol of the general Formula I

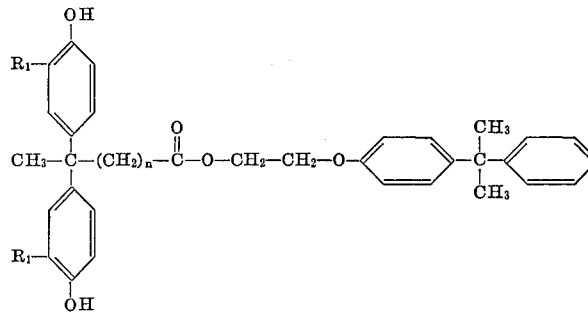

in an amount within the range of from 0.001 to 5% by weight, calculated on the polyolefin, and as component (b) a dialkyl disulfide of the general Formula II

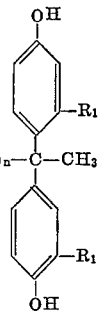

$R_2$—S—S—$R_3$ also in an amount within the range of from 0.001 to 5% by weight, calculated on the polyolefin, in which formulae $R_1$ represents a hydrogen atom or an alkyl group with 1 to 4 carbon atoms, $R_2$ and $R_3$ are identical or different alkyl radicals with 8 to 20 carbon atoms, $n$ is 1 or 2 and the mixing ratio of the components (a) and (b) is within the range of from 1:9 to 9:1.

The present invention also provides novel tetraphenols of the above general Formula I, in which R represents a hydrogen atom or an alkyl group with 1 to 4 carbon atoms.

The manufacture of the tetraphenols used in accordance with the invention, in which $n$ is 1, is carried out in two stages: first, 2 molecules of diketene are additively combined with bis($\beta$ - hydroxy - ethyl)dioxydiphenyl-dimethyl-methane in the presence of a basic catalyst. The bis-(acetoacetic ester) is condensed in a second stage with phenol or o-alkyl-phenols under acid conditions at a temperature within the range of from 10 to 40° C. If $n$ is 2, levulinic acid is first condensed with phenols and the bisphenol-carboxylic acid so obtained is esterified with bis-($\beta$-hydroxy-ethyl)-dioxy-diphenyl-dimethyl-methane.

As phenol components, phenol-2-methyl-phenol, 2-propylphenol, 2-sec.butyl-phenol and 2-tert.butyl-phenol are used.

As component (b) aliphatic disulfides, for example di-(dodecyl) disulfide or di-(octadecyl)disulfide are used in the stabilizer mixture in accordance with the invention.

The stabilizer mixture in accordance with the invention is especially suitable for stabilizing plastic materials which come into contact with hot water, for example housewares, pieces of washing and dish washing machines, hot water pipes and polyolefin fibers.

The polyolefins to be stabilizid in accordance with the invention are especially those containing tertiary carbon atoms. Polyolefins of this type are preferably those which, owing to the nature of the monomer, already contain side chains and, consequently, tertiary carbon atoms, in the polymerization and poly-4-methylpentene. Low density polyethylene and high density polyethylene containing side chains which may be short or long, as a result of side reactions may also be stabilized in accordance with the invention. The polypropylene which is advantageously stabilized by the process in accordance with the invention, is manufactured like high density polyethylene for example with the known Ziegler low pressure polymerization catalysts described, for example, by Raff-Allison in "Polyethylene," pages 72 to 81.

The stabilizers may be admixed with the polyolefins together or successively while advantageously using a mixture consisting of a high amount of stabilizer and a small amount of polyolefin. For this purpose, a concentrated solution of the stabilizers is mixed in a low-boiling solvent, for example acetone or methylene chloride, with a small amount of the pulverulent polymerization product to be stabilized in a ratio such that the mixture contains about 30 to 40% by weight of stabilizer after evaporation of the solvent.

By proceeding in this manner, a dry powder is obtained which may be incorporated in usual manner in the polymer to be stabilized to obtain the desired concentration of stabilizer in the finished mass. The stabilizers may of course also be incorporated during the manufacturing process of the polymerization products or their working up. This mode of working has the particular advantage that the polymer is protected against the action of light and atmospheric oxygen, especially at elevated temperatures, already in an early stage, i.e. during the manufacturing process or the working up. The polyolefins so stabilized may be further worked according to the known forming processes, i.e. compression, injection-moulding and extrusion.

The following example serves to illustrate the invention but is not intended to limit it:

EXAMPLE 10 grams of the polypropylene powder to be stabilized were mixed with a 5% solution of the stabilizers indicated in the following tables in a quantitative ratio such that the stabilizer concentration calculated on polypropylene was five-times the amount of the stabilizer concentration indicated in the following Tables. After drying at 80° C. in vacuo the stabilized polypropylene was thoroughly mixed with 400 grams of unstabilized powder and the mixture then granulated at 200° C. in a Battenfeld laboratory extruder. The test granular product was then injection-moulded at 275° C. in an Arburg injection-moulding automate to yield small plates 1 millimeter thick.

From each injection-moulded plate several test strips each 10 millimeters large and 100 millimeters long were cut and immersed in a vessel through which running water of 98° C. flowed. After 4 weeks the test strips were withdrawn and freely suspended at 140° C. in a circulating air drying cabinet to determine the stability against oxidation. The time of embrittlement of the test strips was taken as a measure for their stability against oxidation. The time of embrittlement was herein the time in days after which the test strips stored at 140° C. broke when being bent through 180° or began to disintegrate in the form of powder.

The aging test at elevated temperatures in a circulating air drying cabinet is carried out under much severer conditions than in a normal drying cabinet without circulating air because of the continuous air circulation and fresh air inlet.

As phenolic components the following types of compounds were used:

in Table 1

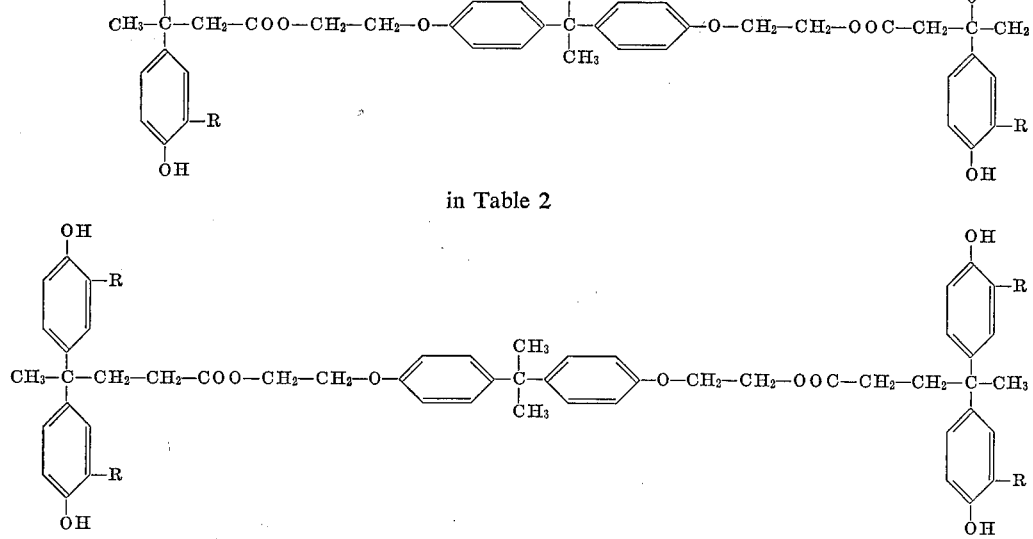

in Table 2

TABLE 1

| Test Number: | Stabilizers (in accordance with the invention) | Concentration percent b.w. | Time of embrittlement in days at 140° C. |
|---|---|---|---|
| 1 | R=—CH₃ / di(octadecyl)disulfide | 0.1 / 0.25 | 36 |
| 2 | R=-sec.-butyl / di(dodecyl)disulfide | 0.1 / 0.25 | 44 |
| 3 | R=-tert.butyl / di(octadecyl)disulfide | 0.1 / 0.25 | 48 |
| Comparison tests, individual components | | | |
| 4 | R=—CH₃ | 0.3 | 6 |
| 5 | R=-sec.butyl | 0.3 | 12 |
| 6 | R=-tert.butyl | 0.3 | 16 |
| 7 | di(dodecyl)disulfide | 0.3 | 1 |
| 8 | di(octadecyl)disulfide | 0.3 | 1 |

TABLE 2

| Test Number: | Stabilizers (combination in accordance with the invention) | Concentration percent b.w. | Time of embrittlement in days at 140° C. |
|---|---|---|---|
| 9 | R=—CH₃ / di(octadecyl)disulfide | 0.1 / 0.25 | 32 |
| 10 | R=-sec.butyl / di(octadecyl)disulfide | 0.1 / 0.25 | 40 |
| 11 | R=-tert.butyl / di(octadecyl)disulfide | 0.1 / 0.25 | 42 |
| Comparison tests, individual components | | | |
| 12 | R=—CH₃ | 0.3 | 4 |
| 13 | R=-sec.butyl | 0.3 | 11 |
| 14 | R=-tert.butyl | 0.3 | 10 |

TABLE 3

| Test Number: | Stabilizers (comparison tests not in accordance with the invention) | Concentration percent b.w. | Time of embrittlement in days at 140° C. |
|---|---|---|---|
| 15 | 1,4-bis[di(5-tert.butyl-4-hydroxy-2-methylphenyl)methyl]benzene. | 0.3 | 4 |
| 16 | Thio-dipropionic acid lauryl ester. | 0.3 | 1 |
| 17 | 1,4-bis[di(5-tert.butyl-4-hydroxy-2-methylphenyl)methyl]benzene. / Thio-dipropionic acid lauryl ester. | 0.1 / 0.25 | 19 |

Tests 1 to 17 were carried out according to the method described above: the stabilizers were incorporated in the polypropylene powder via a solution, the stabilized plates were immersed for 4 weeks in running water of 98° C. and then subjected to a heat treatment at 140° C. in a circulating air drying cabinet.

Tables 1 and 2 show the values obtained for the stabilizer combinations used in accordance with the invention as well as the times of embrittlement of the individual components. Table 3 shows comparison tests according to German Pat. 1,235,582.

Tests 4 to 6 and 12 to 14 show that the tetraphenols have a stabilizing effect which is, however, extraordinarily improved by the addition of a dialkyl disulfide (tests No. 1 to 3, 9 to 11). The sulfur compounds alone are inefficient as tests No. 7, 8 and 16 show. A comparison of Tables 1 and 2 with Table 3 shows that the combination in accordance with the invention is superior to the combination proposed in German Pat. 1,235,582.

What is claimed is:

1. A moulding composition of an alpha-olefin polymer and a stabilizer mixture composed of components (a) and (b), in which as component (a) a tetraphenol of the general Formula I is used in an amount within the range of from 0.001 to 5% by weight, calculated on the polyolefin, and as component (b) a dialkyl disulfide of the general Formula II $$R_2-S-S-R_3$$

also in an amount within the range of from 0.001 to 5% by weight, calculated on the polyolefin, in which $R_1$ represents a hydrogen atom or an alkyl group with 1 to 4 carbon atoms, $R_2$ and $R_3$ are identical or different alkyl radicals with 8 to 20 carbon atoms, $n$ is 1 or 2 and the mixing ratio of the components (a) and (b) is within the range of from 1:9 to 9:1.

2. A moulding composition as claimed in claim 1, wherein a compound selected from the group consisting of di-(dodecyl)-disulfide and di-(octadecyl)-disulfide is used as component (b).

3. A moulding composition as claimed in claim 1, wherein the poly- alpha-olefins is selected from the group consisting of polypropylene, polybutylene and poly-4-methyl-pentene.

4. A shaped article manufactured from the moulding composition of claim 1.

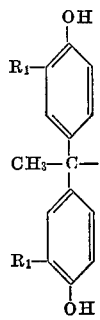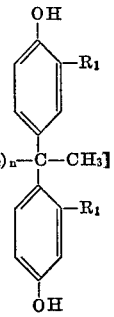

References Cited
UNITED STATES PATENTS

| | | | |
|---|---|---|---|
| 3,174,946 | 3/1965 | Schooter | 260—45.7 |
| 3,392,141 | 7/1968 | Blumberg et al. | 260—45.85 |
| 3,422,059 | 1/1969 | Taylor et al. | 260—45.85 |

DONALD E. CZAJA, Primary Examiner

V. P. HOKE, Assistant Examiner

U.S. Cl. X.R.

260—45.7, 45.85, 45.95, 473